E. FUCHS.
CHASSIS FOR AUTOMOBILE VEHICLES.
APPLICATION FILED DEC. 31, 1919.
1,400,045.
Patented Dec. 13, 1921.
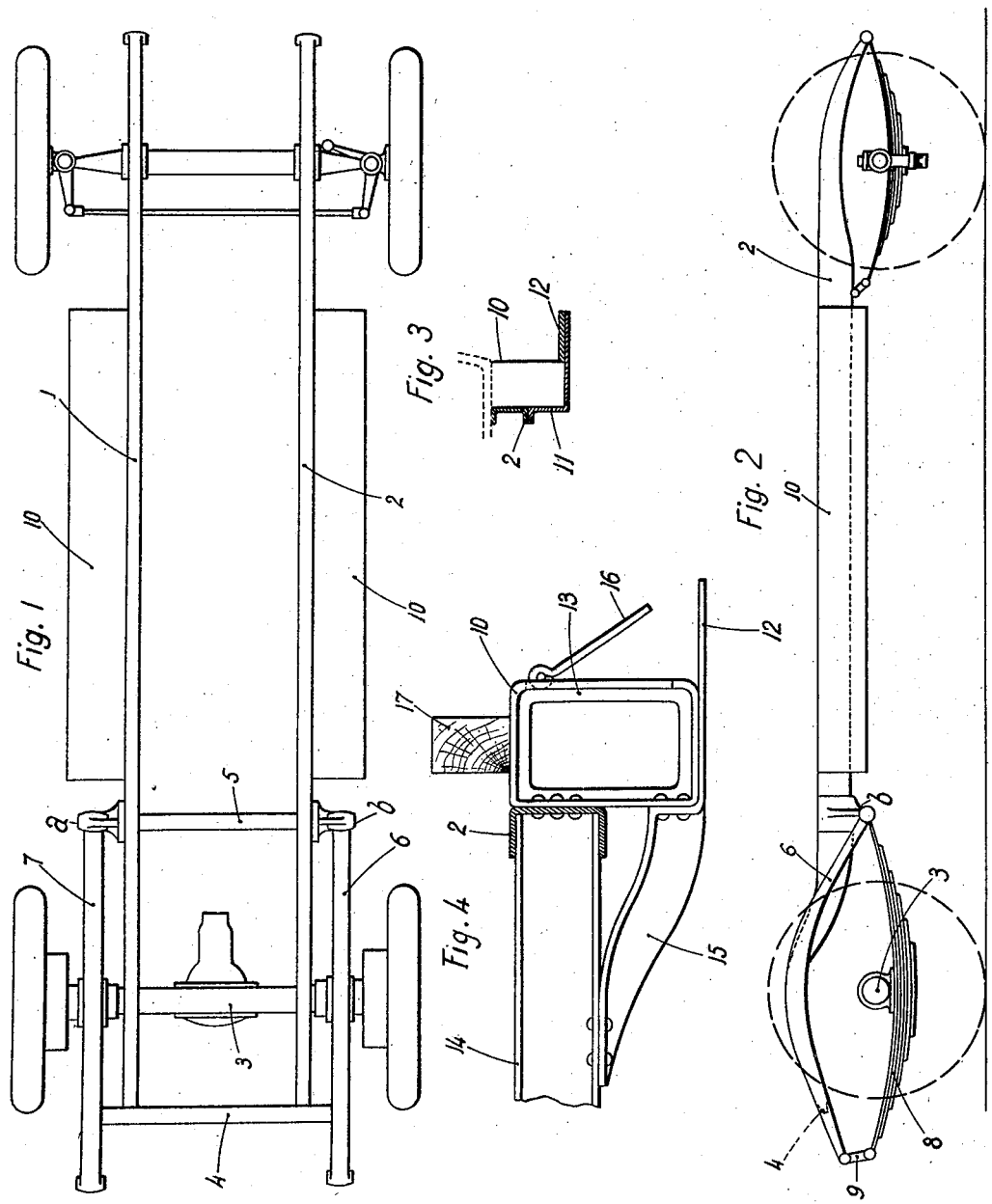
Inventor.
Ernest Fuchs
by Chas. J. O'Neill
Atty

UNITED STATES PATENT OFFICE.

ERNEST FUCHS, OF PARIS, FRANCE, ASSIGNOR TO LOUIS RENAULT, OF BILLANCOURT, FRANCE.

CHASSIS FOR AUTOMOBILE VEHICLES.

1,400,045.   Specification of Letters Patent.   Patented Dec. 13, 1921.

Application filed December 31, 1919. Serial No. 348,709.

*To all whom it may concern:*

Be it known that I, ERNEST FUCHS, engineer, citizen of the French Republic, residing at Paris, Department of the Seine, France, have invented certain new and useful Improvements in Chassis for Automobile Vehicles, of which the following is a specification.

This invention has for its object a chassis for automobile vehicles in which the space between the two longitudinal side frames (hereinafter referred to as the main side frames) is uniform, and corresponds to the minimum space necessary to permit of steering the front wheels. The chassis is provided with two secondary or auxiliary side frames disposed outside the main side frames and in the rear part of the chassis. The secondary or auxiliary side frames are fixed at one end to the rear cross beam of the chassis, the other ends of the secondary or auxiliary side frames being rigidly attached to brackets carried by the chassis or to the chassis direct. The rear suspension springs are mounted at their forward ends on the aforesaid brackets or on the chassis perpendicularly to the said frames thereof, and the said springs are connected by means of links to the rear ends of the secondary or auxiliary side frames.

This arrangement permits, in chassis of small width, of placing the rear springs in the ordinary space necessary for efficient suspension, while avoiding the exaggerated overhang of the spring hangers, by the addition of the secondary or auxiliary frames hereinbefore described. The main advantage of the reduced width of the chassis consists in being able to place large trunks or chests along the main side frames between said side frames and the footboards of the vehicle.

In the accompanying drawing,

Figure 1 is a plan view of a chassis in accordance with the present invention.

Fig. 2 is a side view of the chassis, and

Figs. 3 and 4 are detail views hereinafter described.

The chassis is formed of two straight longitudinal frames 1 and 2, connected together at any desired distance apart by cross beams. The space corresponds to the space which is necessary to permit of easily and readily steering the front wheels. The rear axle or the housing thereof is indicated at 3, and rearwardly and forwardly of the axle 3 or its housing are disposed the cross frames or beams 4 and 5 of which the former forms the rear cross beam of the chassis while the cross beam 5 forms an intermediate cross beam, the outer ends of which are attached to the chassis and serve for the attachment of the springs as indicated at $a$ and $b$. The cross beam 4 is extended at each end beyond the main side frames 1 and 2. Secondary or auxiliary side frames 6 and 7 are disposed parallel to the side frames 1 and 2 and exteriorly thereof, the said auxiliary frames 6 and 7 being extended beyond said main side frames and fixed to the ends of the cross beam 4.

The suspension springs 8 are placed directly below the secondary or auxiliary frames 6 and 7, and the said springs are pivotally connected at their front ends to the brackets $a$, $b$, exteriorly of the main frames 1 and 2, and at their rear ends to the rear ends of the secondary or auxiliary frames 6 and 7 by means of links 9. Chests or boxes 10 can be arranged along the greater part of the length of the chassis along the main frames 1 and 2, and outside thereof between additional angle frames 11 and the footboard 12 (Fig. 3). It is obvious that the vehicle body can extend laterally beyond the main side frames 1 and 2 so as to obtain a carriage body of normal width. This carriage body preferably hides the rear auxiliary frames 4 of the chassis.

Fig. 4 shows a method of construction and a method of fixing the chests or boxes. One of the side frames of the chassis is represented at 2, and the box placed against this frame and outside thereof is indicated at 10. The box is formed by sheets of metal assembled and mounted on the frames 13 disposed at suitable intervals along the side frame 2. In this construction the frames 13 are riveted or fixed in any suitable manner to the side frames and to additional cross beams 14 by means of brackets 15. The boxes are provided with doors 16 disposed at the side thereof in any convenient position.

The footboards 12 project beyond the edges of the boxes 10 as previously described.

Claims:

1. A chassis for automobile and like vehicles comprising main side frames placed the minimum distance apart required for the steering of the front wheels, a pair of cross beams connecting said main side frames at their extreme rear and intermediate portions, a pair of auxiliary side frames disposed outside of said main frames and connected to said cross beams, and suspension springs having their ends connected to the ends of the auxiliary side frames, said springs being positioned directly beneath the auxiliary side frames.

2. A chassis for automobile and like vehicles comprising main side frames placed the minimum distance apart required for the steering of the front wheels, a pair of cross beams connecting said main side frames at their extreme rear and intermediate portions, said cross beams having their ends extending beyond the main side frames, a pair of curved auxiliary side frames disposed outside of said main frames and connected to the ends of said cross beams, and bowed suspension springs having their ends connected to the ends of the auxiliary side frames, said springs being positioned directly beneath the auxiliary side frames.

In testimony whereof I have hereunto set my hand in presence of two subscribing witnesses.

ERNEST FUCHS.

Witnesses:
 LOUIS JONS,
 ERICH KLOK.